UNITED STATES PATENT OFFICE.

FREDERICK WM. BROOKS, OF ALAMEDA, CALIFORNIA, ASSIGNOR TO THE LIQUID STONE PAINT CO., OF SAN FRANCISCO, CALIFORNIA, A CORPORATION OF CALIFORNIA.

FIRE-RESISTING PAINT.

1,083,916.      Specification of Letters Patent.      Patented Jan. 13, 1914.

No Drawing.      Application filed May 22, 1911.     Serial No. 628,632.

*To all whom it may concern:*

Be it known that I, FREDERICK W. BROOKS, citizen of the United States, residing at Alameda, in the county of Alameda and State of California, have invented new and useful Improvements in Fire-Resisting Paint, of which the following is a specification.

My invention relates to paints, and pertains especially to a fire retardant and damp proofing paint for wooden buildings; also a damp proofing for concrete and brick buildings and other structures.

The object of this invention is to provide a durable paint or compound for fire proofing and damp proofing purposes, and which is particularly applicable to wooden structures for the purpose of rendering the same fire resisting and impervious to water.

The invention resides in the combination and mixture of the following ingredients:—

*Mixture No. 1.*—2 parts of finely ground silica, at least 95% pure; 1 part of finely ground, double burned or calcined or dead burned magnetite; 1 part of finely ground semi-calcined magnesite. These three ingredients are thoroughly mixed together to form the base of my dry product.

*Mixture No. 2.*—20% magnesium sulfate—20° to 30° Baumé; 20% ammonium chlorid—20° to 30° Baumé; 20% chlorid of strontium—20° to 30° Baumé; 40% water. This forms my thinning or mixing liquor.

*Mixture No. 3.*—As an alternative thinner, or in conjunction with mixture #2, I may use: 40% magnesium chlorid reduced to 22° to 26° Baumé: 60% water.

The above mixtures #1 and #2, or #1 and #3, are mixed together in suitable proportions to form a paint, the quantity of each mixture varying according to the consistency desired. Ordinarily, a practical, easy working paint is provided by taking one pound of #1 and one-half a pint of #2 or #3.

This paint when applied to a wooden surface forms a crust or veneer on the surface, rendering it impermeable to water, and practically impervious to the action of fire. When dry, the paint is of a hard, vitreous character.

By reason of its characteristics and qualities, it is called, "liquid stone paint."

Having thus described my invention, what I claim and desire to secure by Letters Patent is—

A paint having a body consisting of approximately two parts of finely ground silica, one part of finely ground double-burned magnesite, one part of finely ground semi-calcined magnesite, and a binder consisting of a solution containing magnesium sulfate and a chlorid.

In testimony whereof I have hereunto set my hand in the presence of two subscribing witnesses.

FREDERICK WM. BROOKS.

Witnesses:
R. G. PENDEGAST,
H. B. DENSON.

Copies of this patent may be obtained for five cents each, by addressing the "Commissioner of Patents, Washington, D. C."